S. W. FARNSWORTH.
MEASURING DEVICE.
APPLICATION FILED JULY 3, 1916.
1,266,570.
Patented May 21, 1918.
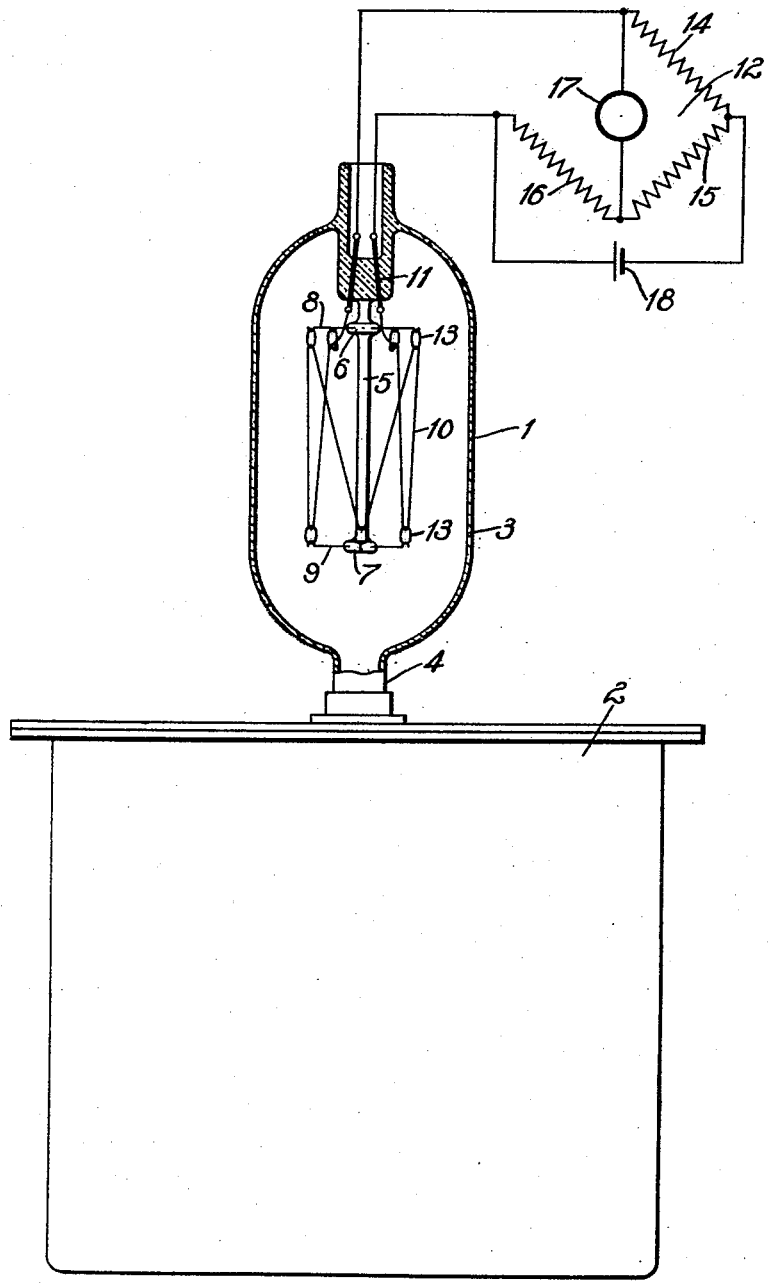
WITNESSES:
R. J. Fitzgerald.
J. A. Procter
INVENTOR
Sidney W. Farnsworth
BY
Wesley G. Carr
ATTORNEY

UNITED STATES PATENT OFFICE.

SIDNEY W. FARNSWORTH, OF PITTSBURGH, PENNSYLVANIA, ASSIGNOR TO WESTINGHOUSE ELECTRIC AND MANUFACTURING COMPANY, A CORPORATION OF PENNSYLVANIA.

MEASURING DEVICE.

1,266,570.  Specification of Letters Patent.  Patented May 21, 1918.

Application filed July 3, 1916. Serial No. 107,282.

*To all whom it may concern:*

Be it known that I, SIDNEY W. FARNSWORTH, a citizen of the United States, and a resident of Pittsburgh, in the county of Allegheny and State of Pennsylvania, have invented a new and useful Improvement in Measuring Devices, of which the following is a specification.

My invention relates to measuring devices and particularly to means for accurately determining variations in temperature and pressure by the use of a resistor the resistance of which is adapted to vary in accordance with changes in temperature and pressure.

The object of my invention is to provide means for so supporting the resistor of a device of the above indicated character that the heat developed by the resistor will not be transmitted away by conduction.

It has been determined, as set forth in copending application Serial No. 50,077, filed September 10, 1915, by William Tschudy and assigned to the Westinghouse Electric and Manufacturing Company, that, if a resistor is disposed in an evacuated vessel, the resistance of the resistor will vary in accordance with the temperature to which the vessel is subjected, and it has also been determined that, if the vessel is maintained at a constant temperature, and the degree of vacuum changes, the resistance of the resistor will change in accordance with the change in vacuum. While this method of determining temperature and pressure has been found satisfactory, I have observed that more accurate results may be obtained if the resistor is so insulated from its supporting casing as to prevent the heat generated or developed by the resistor from being conducted away. In view of this, I provide a stem and such insulating means for supporting the resistor from the stem as to preclude the conduction of heat from the resistor to the stem. Thus, the total heat generated by the resistor will be used in changing its resistance which may be easily measured by a Wheatstone bridge, a potentiometer or other similar device.

The single figure of the accompanying drawing is a diagrammatic view of a measuring device embodying my invention and illustrating an application of the same for determining internal pressure or the degree of vacuum.

A vacuum gage 1 is provided for the purpose of determining the degree of vacuum or internal pressure of a receptacle 2 and comprises a casing 3 that communicates, through an opening 4, with the interior of the receptacle 2. A stem 5 is secured to the casing 3 and is preferably constructed of glass, quartz or any other non-conducting material. The stem 5 is enlarged at points 6 and 7 and is provided with supporting members 8 and 9 that are hooked at their outer ends. A resistor 10, in the form of a filament, is connected through leading-in conductors 11 and constitutes one arm of a Wheatstone bridge 12. The filament or resistor 10 is disposed around the stem 5 and is supported by loops 13 of silk or other non-heat-conducting bodies from the supporting members 8 and 9. If the current traversing the filament 10 is relatively low, the loops 13 may be of silk. However, if the current is relatively high, the loops 13 may be constructed of quartz or other high-temperature-resisting insulators. The essential feature of the invention is that the heat developed by the filament 10 will not be transmitted to the stem 5 by conduction and, consequently, relatively more of the heat will be used to change the resistance of the filament 10 and thus more accurate results will be obtained. It will be understood that the non-conducting loops 13 are not used for the purpose of positioning the filament 10 but for the purpose of supporting the same.

The Wheatstone bridge 12 comprises resistors 14, 15 and 16, an indicating instrument 17 and a source 18 of electromotive force. When the degree of vacuum changes in the receptacle 2 and the vacuum gage 1 is maintained at a constant temperature, the resistance of the resistors 15 and 16 may be so varied as to obtain a balance in the bridge for the purpose of measuring the resistance of the filament 10. The change in resistance in the filament or resistor 10 is proportional to the change in pressure in the receptacle 2.

While I have illustrated my invention as particularly adaptable to measuring devices, it will be understood that it may equally well be applied to incandescent lamps and other devices without departing from the spirit and scope of the invention, as set forth in the appended claims.

I claim as my invention:

1. The combination with an insulating stem, and supports mounted on the said stem, of a plurality of filament loops arranged adjacent said stem, and insulating means for securing the said loops to the said supports to preclude conduction of the heat generated by the filament loop to the stem.

2. The combination with a supporting stem, and lateral supports mounted on the said stem, of a plurality of filament loops arranged around the said stem, and non-heat-conducting means for securing the said loops to the said lateral supports.

3. The combination with an insulating supporting stem, of filament loops disposed around the said stem, and non-heat-conducting means for securing the ends of the said loops to the supporting stem.

4. The combination with an insulating supporting stem, of filament loops disposed around the said stem, and flexible insulating means for securing the ends of the said loops to the supporting stem.

5. The combination with an insulating supporting stem, of filament loops disposed around the said stem, and fibrous means for securing the ends of the said loops to the supporting stem.

6. The combination with an insulating supporting stem, of filament loops disposed around the said stem, and fibrous means for securing the said loops to the supporting stem.

7. The combination with a supporting stem, of a filament, and means for so supporting the said filament on the said stem that the heat generated by the filament will not be conducted to the supporting stem.

8. The combination with a supporting stem, of a filament, and silk loops for so supporting the said filament on the said stem that the heat generated by the filament will not be transmitted to the stem by conduction.

9. In a vacuum gage, the combination with a non-conducting casing and a stem therein, of a filament, and non-conducting means for so supporting the said filament on the said stem that the heat generated by the said filament will not be transmitted to the said casing and stem by conduction.

In testimony whereof, I have hereunto subscribed my name this 29th day of June 1916.

SIDNEY W. FARNSWORTH.